United States Patent [19]

Kapustka

[11] 4,084,124
[45] Apr. 11, 1978

[54] METHOD AND APPARATUS FOR CONDITIONING OF NICKEL-CADMIUM BATTERIES

[75] Inventor: Robert E. Kapustka, Huntsville, Ala.

[73] Assignee: The United States of America as represented by the Administrator of the National Aeronautics and Space Administration, Washington, D.C.

[21] Appl. No.: 744,573

[22] Filed: Nov. 24, 1976

[51] Int. Cl.² ............................................. H02J 7/00
[52] U.S. Cl. ........................................ 320/9; 320/13; 320/15; 320/32; 320/39
[58] Field of Search ................. 320/2, 9, 21, 31, 35, 320/39, 40, 48, 14, 15, 13, 32

[56] References Cited

U.S. PATENT DOCUMENTS

| | | | |
|---|---|---|---|
| 3,305,754 | 2/1967 | Oaks et al. | 320/40 X |
| 3,454,859 | 7/1969 | Ford et al. | 320/31 X |
| 3,930,192 | 12/1975 | Dinkler | 320/21 X |
| 3,997,830 | 12/1976 | Newell et al. | 320/35 X |

Primary Examiner—Robert J. Hickey
Attorney, Agent, or Firm—George J. Porter; J. R. Manning; L. D. Wofford, Jr.

[57] ABSTRACT

A method and apparatus for reconditioning batteries utilizing a DC-DC converter. During a discharge of the batteries, each cell is monitored by the converter. When the voltage of a cell decreases to a predetermined level, a converter will assume the load of this cell and inhibit the voltage from reaching zero, thereby preventing voltage reversal of that cell.

11 Claims, 2 Drawing Figures

4,084,124

METHOD AND APPARATUS FOR CONDITIONING OF NICKEL-CADMIUM BATTERIES

ORIGIN OF THE INVENTION

The invention described herein was made by an employee of the United States Government and may be manufactured and used by or for the Government for governmental purposes without the payment of any royalties thereon or therefor.

FIELD OF THE INVENTION

The present invention relates to a method and apparatus for reconditioning batteries and has particular application in the field of reconditioning nickel-cadmium batteries used in outer space applications.

BACKGROUND OF THE INVENTION

Due to the unique problems of space exploration, different power sources had to be developed for powering the many electrical components which are utilized in space rockets, capsules or other devices. Many of these power sources contained a battery having a number of nickel-cadmium sintered plate cells, since these cells have a high energy density and can be recharged. A primary factor in the power system that used a nickel-cadmium battery is the capacity degradation of the batteries. Since obviously, these batteries while used in space cannot be physically replaced, an approach must be developed which would extend the capacity life by periodically reconditioning the batteries. A prior method of reconditioning these batteries has been accomplished by using relays to individually control the discharge of each cell. However, it has been determined that this method is not practical for inflight applications because of the bulk and complexity of using a relay, cell sensing and relay control circuitry for each individual cell.

In developing a method which can be utilized in inflight applications, it should be remembered that the voltage of a nickel-cadmium cell should not be reversed during a discharge since there is a chemical reaction which produces hydrogen gas. This gas can build up considerable pressure in a sealed cell or cause a vented cell to emit the hydrogen gas. Either situation can be detrimental to the battery plus hazardous to any personnel which are in the area. Since these cells are never identical, there will always be some cells which would go through zero and reverse before other cells are discharged. Therefore, a method must be developed which prevents the cell reversal of the nickel-cadmium battery.

The need for reconditioning a nickel-cadmium battery is important since it has been demonstrated that as the result of "memory" or "fading" the effective energy capacity of the nickel-cadmium battery can be decreased by as much as 60-80% under operating conditions.

A review of the prior art indicates that while it is old to increase the life of a nickel-cadmium battery by reconditioning, no prior art reference was discovered which efficiently monitors each cell of the battery for preventing cell reversal. A typical prior art reference is British patent 1,256,980 issued to Brinsley Hodge. This patent is directed to a method for restoring the electrical capacity of nickel-cadmium cells by subjecting each cell to a complete discharge by connecting a resistance means across its electrodes. Additional prior art devices include British patent 864,844 issued to John Jephcott and French patents 1,203,578 and 1,217,578. However, none of these references disclose a device which efficiently monitors each cell of a nickel-cadmium battery to prevent the cells of the battery from reversing polarity.

SUMMARY OF THE INVENTION

The present invention, as described herein, is directed to a method and apparatus for reconditioning a nickel-cadmium, or for that matter, any battery, by using a DC-DC converter to monitor the voltage of each cell in the battery. When the voltage of the cell is reduced to a predetermined small voltage, the converter assumes a portion of the load on that cell and thus prevents the voltage of that cell from ever becoming zero. Since the cell voltage is never zero, it would thus be impossible for the cell to reverse its polarity.

BRIEF DESCRIPTION OF THE DRAWING

These and other features of the present invention may be more fully appreciated when considered in light of the following specification and drawings, in which.

DETAILED DESCRIPTION OF THE PREFERRED EMBODIMENT

Figure 1:
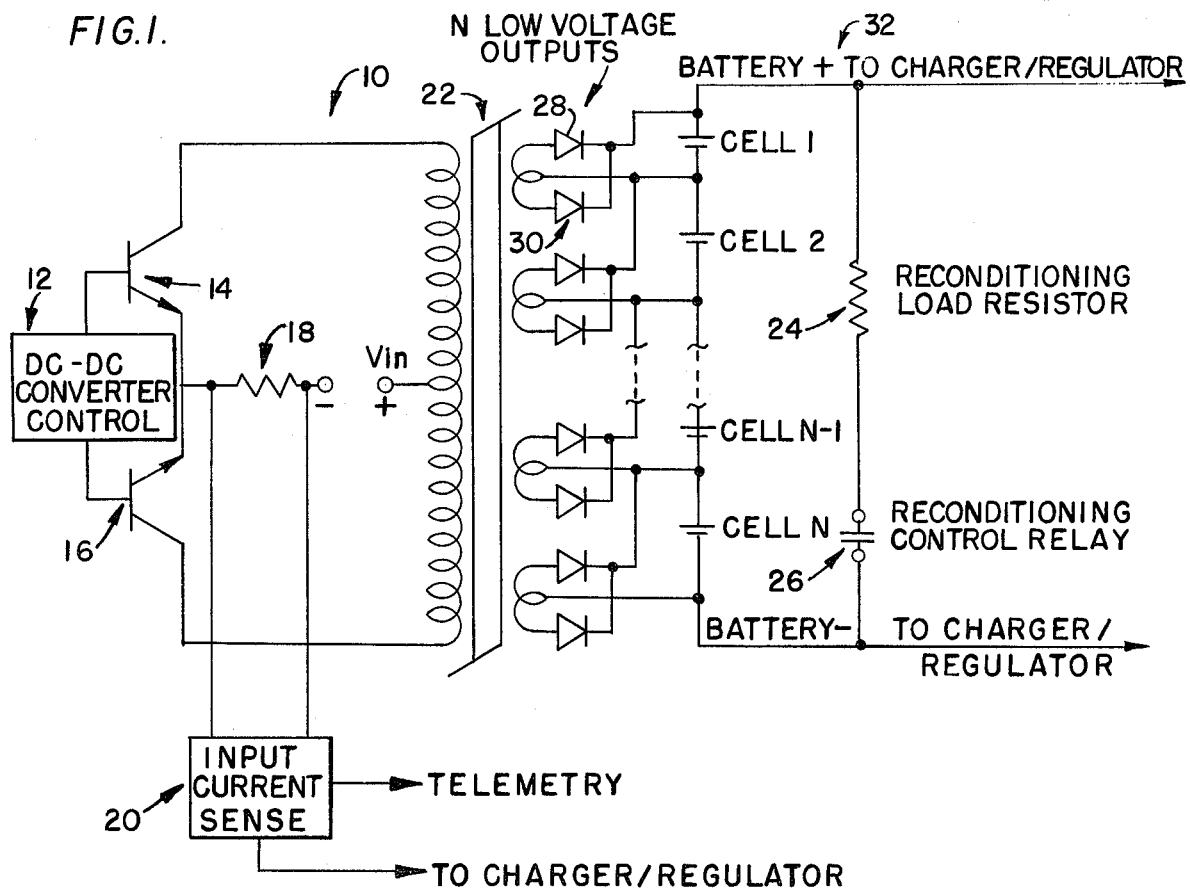
FIG. 1 is a circuit diagram of the apparatus of the present invention.

As shown in FIG. 1, a DC-DC converter 10 is used to recondition a battery 32 containing a plurality of cells 1, 2 . . . N−1, N. The converter 10 is managed by a DC-DC converter control box 12 containing the standard and necessary control electronics to establish the converter frequency of operation, the necessary drive and the required commands. Transistors 14 and 16 are utilized as power switches and are alternatively turned on and off as is common in any typical converter. A transformer 22 containing primary and secondary windings is connected to the power switches 14, 16 and provides the proper turns ratio to convert the input voltage ($V_{in}$) according to the level and number of low voltage outputs required for the battery cells. These outputs contain two rectifying diodes 28 and 30 connected to a single cell of the battery. Each cell of the battery is connected to only one low voltage output.

The turns ratio of the transformer is configured so that the open circuit output voltage of each of the N low voltage outputs is lower than the battery cell voltage for normal operations (for example, less than 0.7V dc). Therefore, since the open circuit output voltage is less than the battery cell voltage, the cell voltage will reverse bias (turn off) the two diodes in each output. With the diode off, no power is drawn in the secondary and only a very low "stand by" power is drawn in the primary of the transformer. When the voltage in a single cell becomes slightly less than the voltage of its corresponding low voltage output, the voltage from the transformer winding would forward bias the rectifier diodes. When this occurs, the converter assumes the load of the low capacity cell and the input current of the converter is increased as a result of the added load.

Therefore, it can be seen that the converter senses the output of each of the cells of the battery during its normal operation and if a single cell falls below a predetermined voltage set according to the voltage of the low voltage outputs, this cell is effectively taken out of the system and the converter assumes the load for that cell. Since the voltage of each cell cannot become zero, it is impossible for a polarity reversal to occur.

This application of a DC-DC converter has several inherent advantages. For example, if one cell in the battery has degraded more rapidly than the others, it can be protected from voltage reversal by the converter and thus allow operational utilization of more of the capacity in the other cells. Furthermore, even if the converter were not designed to carry the full operational load of a cell, it could be used to detect the presence of a low voltage cell, thereby allowing automatic removal or reduction of the operational load on the battery.

As one or more cells lose capacity and their voltages drop below the converter output voltage, the converter will assume a large portion of the load. Depending upon the system requirements, the converter could continue to assist the "weak" cells until a certain fraction (for example, 1/5 to ⅓) of the cells needed help. A current sense resistor 18 and input current sense control 20 can be used to supply analog or digital signals to a remote point for information and decision making. If the battery is utilized in an inflight application, the current information would be sent through standard telemetry to the ground control. According to the information received, a decision can now be made whether to terminate the use of the battery, reduce the battery discharge rate, increase the battery charge current or initiate the battery reconditioning. Since the input current (the current in the primary winding) above the ambient current level is indicative of the current drawn in the secondary caused by the addition of a load due to a low cell voltage, this current would also indicate the number of weak cells. Decisions may also be made automatically, based upon previously established criteria, and discrete signals transmitted to a charger and/or regulator for system operation.

When the decision has been reached to recondition the battery, a signal is sent to remove the battery from its energy source and load (typically a charger and regulator in space flight). A reconditioning control relay 26 is then closed placing a reconditioning load resistor 24 across the battery. Each battery cell then continues to discharge as long as the load is present and the cell's voltage was above the converter low voltage outputs voltage. No cell could be reversed, i.e., driven to the opposite polarity since, as each cell voltage fell below the level of the converter low voltage output voltage for the cell, the converter assumes the load. This limits the minimum voltage to which the cell would fall. This mode of operation would continue until all cells had reached some minimum voltage and/or some definite time limit had elapsed. After completion of the reconditioning operation, the reconditioning control relay 26 is then opened and the battery is reconnected to the bus or the primary energy source through a current limit and recharged at a trickle to some prescribed level (such as 30-80% of rated capacity). By use of this method, the cell voltage is reduced to just a few tenths of a volt and cell reversal is prevented. The type of charging used is immaterial and methods such as constant current, constant potential and modified constant potential can be utilized. Additionally, the type of charging equipment is also immaterial. After the battery has been fully charged, it is then returned to normal system operation.

Figure 2:
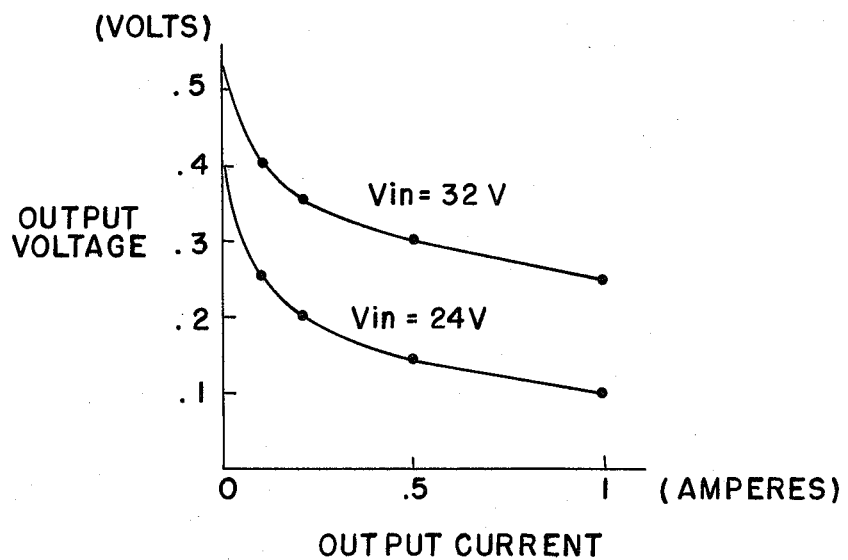
FIG. 2 is a graph of typical low voltage outputs of the DC-DC converter having input voltages of 24 and 32 volts.

FIG. 2 shows the electrical characteristics of a typical low voltage output of the DC-DC converter. The input current to the DC-DC converter is the current in the primary winding of the converter transformer. Due to the specific turns ratio, this primary current is proportional to the secondary currents in the low voltage outputs. The current in each low voltage output is zero until the voltage of the cell it is connected to is low enough to allow the voltage from the transformer winding to forward bias the rectifier diodes. This graph shows the current conducted through the rectifier diodes (the "output current") versus the voltage of the cell it is connected to (the "output voltage") for converter input voltages of 24 and 32Vdc. The main point to be emphasized is that before a cell reaches 0 volts, it will cause current to be conducted in a transformer output winding associated with that cell. This current is such that it relieves the cell from carrying all the battery discharge current and also reflects itself as increase in the current in the primary winding.

Although this invention has been described with reference to a nickel-cadmium battery, it should not be construed to be so limited. The circuit of the present invention would be applicable to any battery in which it is desirable to prevent cell voltage reversal during normal operations or during a reconditioning period, if the battery being used would benefit from a periodic complete discharge. Furthermore, the system configuration of the present invention does not dictate any particular type of battery charger or power source since the battery is disconnected from the system during the reconditioning period. The reconditioning requires that the battery be discharged to a very low voltage, therefore, the charger must be shut off or removed to allow this to be accomplished. In the same sense, it does not matter what the battery power is normally used for. It could feed its DC voltage directly to a power bus or to a regulator which would then supply whatever kind of voltage, AC or DC, which is required by the power system. Furthermore, this particular type of reconditioning is not limited to just inflight applications, but may be utilized even in a ground application if it were desirable to have a compact, reliable circuit to accomplish reconditioning and/or low cell voltage detection.

While this invention has been described in great detail, it would be obvious to those skilled in the art that various changes may be made without departing from the scope of the invention and the invention is not to be considered limited to what is shown in the drawing and described in the specification. For example, the DC-DC converter need not be constantly connected across the battery, but can be activated after the battery has been in operation for a certain amount of time.

What is claimed is:

1. A method for reconditioning a battery, having a plurality of cells, connected to an energy source comprising the steps of:
   connecting across each cell a means for assuming the load of each cell when the voltage of each cell is reduced to a predetermined value;
   removing the battery from the energy source;
   placing a load across the battery;
   allowing the cells of the battery to discharge until all of the cells have reached said predetermined value;
   removing said load from across the battery; and
   recharging the battery.

2. A method for reconditioning a battery according to claim 1 wherein a DC-DC converter is utilized in said connecting step.

3. A method for reconditioning the battery according to claim 2 further including the step of monitoring the input current of the DC-DC converter to properly determine the correct time to remove the battery from its energy source for initiating the reconditioning process.

4. A method for reconditioning a battery, having a plurality of cells, connected to an energy source comprising the steps of:
 connecting across each cell a means for assuming the load of each cell when the voltage of each cell is reduced to a predetermined value;
 removing the battery from the energy source;
 placing a load across the battery;
 allowing the cells of the battery to discharge for a predetermined period of time;
 removing said load from across the battery; and
 recharging the battery.

5. A method for reconditioning a battery according to claim 4 wherein a DC-DC converter is utilized in said connecting step.

6. A method for reconditioning a battery according to claim 5 further including the steps of monitoring the input current of the DC-DC converter to properly determine the correct time to remove the battery from its energy source for initiating the reconditioning process.

7. A device for reconditioning a battery having a plurality of cells comprising:
 monitoring means containing a plurality of outputs, one output placed in parallel with a single cell of the battery, for sensing the voltage of each of the cells;
 a control relay placed across all of the cells of the battery;
 a load resistor placed in series with said relay whereby each of the outputs of said monitoring means senses the voltage of each cell and if the voltage of each cell reaches a predetermined value, said monitoring means assumes the load thus preventing the voltage in each cell from becoming zero.

8. A device for reconditioning a battery according to claim 7 wherein said monitoring means is a DC-DC converter.

9. A device for reconditioning a battery according to claim 7 further including a means for sensing the input current of said monitoring means.

10. A device for reconditioning a battery according to claim 7 further including a transformer for converting the input voltage of said monitoring means to the level and number of outputs required for the battery.

11. A device according to claim 7 wherein the battery is of the nickel-cadmium type.

* * * * *